(12) United States Patent
Lewis et al.

(10) Patent No.: US 8,374,129 B2
(45) Date of Patent: Feb. 12, 2013

(54) CIRCUIT SWITCHED MILLIMETER WAVE COMMUNICATION NETWORK

(75) Inventors: Brett Lewis, Honolulu, HI (US); John Lovberg, San Diego, CA (US); Tzu-Chiang Hsieh, Freemont, CA (US); Kenneth Y. Tang, Alpine, CA (US); Robert Fein, Newton Centre, MA (US)

(73) Assignee: Trex Enterprises Corp., San Diego, CA (US)

( * ) Notice: Subject to any disclaimer, the term of this patent is extended or adjusted under 35 U.S.C. 154(b) by 198 days.

(21) Appl. No.: 12/930,143

(22) Filed: Dec. 28, 2010

(65) Prior Publication Data

US 2012/0135724 A1    May 31, 2012

Related U.S. Application Data (63) Continuation-in-part of application No. 12/228,114, filed on Aug. 7, 2008, and a continuation-in-part of application No. 12/928,017, filed on Nov. 30, 2010.

(51) Int. Cl.
*H04W 4/00* (2009.01)
(52) U.S. Cl. ............... 370/328; 370/338; 370/310.2; 455/422.1

(58) Field of Classification Search .................. 370/328, 370/338
See application file for complete search history.

(56) References Cited

U.S. PATENT DOCUMENTS

| 6,628,627 B1* | 9/2003 | Ackerman et al. ............ 370/310 |
| 2006/0264210 A1* | 11/2006 | Lovberg et al. ............ 455/422.1 |

* cited by examiner

*Primary Examiner* — Dang Ton
*Assistant Examiner* — Pamit Kaur
(74) *Attorney, Agent, or Firm* — John R. Ross

(57) ABSTRACT

A high bandwidth, low latency middle-mile core communications network providing low-cost and high-speed communications among the users of the network. Embodiments of the invention include a number of network access points located at a number of spaced apart sites. At least some of these network access points in the network are in communication with each other via millimeter radio links with microwave backup links. In preferred embodiments the millimeter radio links include two millimeter radios, one transmitting in the frequency range of 71-76 GHz and receiving in the frequency range if 81 to 86 GHz and the other radio transmitting in the frequency range of 81-86 GHz and receiving in the frequency range if 71 to 76 GHz.

13 Claims, 9 Drawing Sheets

GHz SERVICE NETWORK

GHz SERVICE NETWORK

FIG. 1

PRIVATE LINE SERVICING

FIG. 2

LOCAL AREA NETWORK WTH WiMax

FIG. 3

STANDARD NETWORK ACCESS POINT EQUIPMENT (1) ONE NETWORK SWITCH
    Such as:    a) Ceina Relay Switch (Model CN 3940)

(2) TWO MILLIMETER WAVE RADIOS
    Such as:    a) Loea Model L2710 including antenna (3) TWO MICROWAVE RADIOS
    Such as:    a) Solectek Model Skyway Excel Backhaul Link (4) POWER SUPPLY UNIT
    Such as:    a) Telco Power Supply Units (5) WiMax BASE STATION (Optional)
    Such as:    a) Soletek SkyMax Base Station

CIRCUIT SWITCHED MILLIMETER WAVE COMMUNICATION NETWORK

CROSS REFERENCE TO RELATED APPLICATIONS

This application is a continuation in part of U.S. patent application Ser. No. 12/228,114 formed Aug. 7, 2008 and Ser. No. 12/928,017 filed Nov. 30, 2010 which are incorporated herein by reference.

FIELD OF THE INVENTION

The present invention relates to communication networks and in particular to wireless communication networks.

BACKGROUND OF THE INVENTION

Telecommunication Networks

A telecommunications network is a collection of terminals, links and network access points which connect together to enable telecommunication between users of the terminals. Terminals refer to the end devices where information is originated or terminated. Devices such as phones, computers, printers, smart phones, personal digital assistants are all in the category of terminals. A network access point (sometimes called a "NAP" or a "node") refers to the access point of a network where telecommunication information can pass through from its source terminal to its destination terminal. Hardware and software are used to control the transmission of information at each node. A link refers to the interconnection between two nodes. Modern telecommunications include voice, video and data communications.

A telecommunication network may use circuit switching or packet switching. In case of circuit switching, a link path is decided upon before the data transmission starts. The system decides on which route to follow and transmission goes according to the path. For the whole length of the communication session between the two communicating terminals, the route is dedicated and exclusive, and released only when the session terminates. In the case of packet switching, a link path is not pre-determined. The Internet Protocol (IP), just like many other protocols, breaks data into chunks and wraps the chunks into structures called packets. Each packet contains, along with the data load, information about the IP address of the source and the destination terminals, sequence numbers and some other control information. Once they reach their destination, the packets are reassembled to make up the original data again. In packet switching, the packets are sent towards the destination irrespective of each other. Each packet has to find its own route to the destination. There is no predetermined path; the decision as to which node to hop to in the next step is taken only when a node is reached. Each packet finds its way using the information it carries, such as the IP address of source and destination terminals.

Each terminal in the network must have a unique address so messages or connections can be routed to the correct recipients. The links connect the nodes together and are themselves built upon an underlying transmission network which physically pushes the message across the links. Packets are generated by a sending terminal, then pass through the network of links and nodes until they arrive at the destination terminal. It is the job of the intermediate nodes to handle the messages and route them down the correct links toward their final destination.

The packets consist of control and bearer parts. The bearer part is the actual content that the user wishes to transmit (e.g. some encoded speech, or a segment of an email, or other digital data) whereas the control part instructs the nodes where and possibly how the message should be routed through the network. A large number of protocols have been developed over the years to specify how each different type of telecommunication network should handle the control and bearer messages to achieve this efficiently. All telecommunication networks are made up of five basic components that are present in each network environment regardless of type or use. These basic components include terminals, telecommunications processors, telecommunications channels, computers, and telecommunications control software. Early networks were built without computers, but late in the 20th century their switching centers were computerized or the networks were replaced with computer networks. With the growth of the Internet, a protocol called the Transmission Control Protocol and Internet Protocol (TCP/IP) has become the dominant representation for network design. A protocol called Open System Interconnection model (OSI) preceded TCP/IP and is actually more robust, but TCP/IP is the primary model used in common practice today.

TCP/IP Protocol

An Internet Protocol Suite (IPS) is a set of communication protocols used for the Internet and other similar networks. The most commonly known IPS is TCP/IP, named after two of the most important protocols in it, the Transmission Control Protocol (TCP) and the Internet Protocol (IP). TCP carries the information of the access points between which an IP packet/message is transferred or passing through, whereas IP contains the data, the IP address of source and destination terminals between which a packet/message is transferred across one or more networks and other information including the type of service. Terminals attached to a network using TCP/IP protocol are addressed using IP addresses. TCP is the protocol on which major Internet applications (such as the World Wide Web, e-mail, and file transfer) rely. Telecommunication networks can be connected together to allow users seamless access to resources that are hosted outside of the particular provider to which they are connected. There are many different network structures on which TCP/IP can be use to efficiently route messages, for example:

wide area networks (WAN)
 metropolitan area networks (MAN)
 local area networks (LAN)
 campus area networks (CAN)
 virtual private networks (VPN)

Network Layers

In the early days of networking, International Organization for Standardization (ISO) developed a layering model, called Open Systems Interconnection (OSI), to meet the needs of network designers. The OSI model defines seven layers. The TCP/IP model perform the same duties with four layers. The TCP/IP layers are commonly known as:

Layer 4 Application Layer—Specifies how a particular application uses a network;
 Layer 3 Transport Layer—Specifies how to ensure reliable transport of data;
 Layer 2 Internet Layer—Specifies packet format and routing;
 Layer 1 Link Layer—Moves packets through Internet interfaces.

The layers work together by encapsulating and decapsulating data, and passing the results onto the next layer so that it can be transferred from a user application down to a transmitted signal, and then transformed back again into data useable by a user application at the other end of the connection. In the sending device, application data is transformed from familiar text to binary data in preparation for being converted to a transmittable signal (in TCP/IP, this is a part of the generalized application layer). After that point each layer receives that binary data and wraps its own header around the data, encapsulating it into a packet/message the corresponding layer at the receiving terminal/host device can understand. These headers contain flags and values that those layers use for managing the transmission of the messages. For example a network layer's IP packet header contains values for source and destination IP addresses. As the message progresses down through the layers, each layer encapsulates the data it receives into the format of its own message, and sends it to the layer below. This repeats until the message is sent to the link layer, where it is transformed for the last time into an electrical or optical signal, and it is sent towards its destination. When the signal arrives at its destination, the signal is decoded, and then the message goes up through the layers in reverse order compared to the sending terminal/host device. In the receiver, each layer decapsulates the messages, meaning that it examines the values in the headers, performs any necessary actions, and then removes the payload in the message and sends the payload to the layer above it. This repeats until all the messages/packets are received by the user application on the receiving terminal/host device, and at that point the messages/packets are re-assembled in a format useable to that application.

Gigabit Ethernet

Gigabit Ethernet builds on top of the earlier Ethernet protocols, but increases speed tenfold over Fast Ethernet (100 Mbps) to 1000 Mbps, or 1 gigabit per second (1 Gbps). Gigabit Ethernet is designed for use with optical fibers operating over long distances with long wavelength lasers and short wavelength lasers and with shielded copper cable for short distances such as about 25 meters or less. Gigabit Ethernet adheres to the frame format of earlier Ethernet protocols but utilizes the high speed interface technology of Fibre Channel. This setup maintains compatibility with the installed base of Ethernet and Fast Ethernet products, requiring no frame translation. Ten Gigabit Ethernet provides another factor of ten increase in data rate up to 10 Gbps.

Ethernet Switches

Ethernet switches have been available for several years from suppliers such as Cisco Systems and Ciena Corporation for supporting Ethernet networks. For example the Ciena Model CN 3940 switch features high capacity switching with 24 Gigabit Ethernet user ports in a compact single rack unit. At each of the ports the switch has an SFP connector for connecting high speed Ethernet equipment and a separate RJ-45 connector for connecting lower data rate equipment. The switch uses Carrier Sense Multiple Access with Collision Detection (CSMA/CD) to control access of the connected communication equipment to the network it is supporting. CSMA/CD is a network protocol in which a carrier sensing scheme is used at each interface to permit multiple access without collisions. During the gap between transmissions, each interface (i.e. the equipment at each of the connected ports) has an equal chance to transmit data. If a transmitting station detects another signal while transmitting a frame, it stops transmitting that frame, transmits a jam signal, and then waits for a random time interval before trying to send that frame again. These Ethernet switches can be programmed to encapsulate and tag incoming packets to direct the packets to specific ports of itself and/or other Ethernet switches at distant network access points. The switches can also be programmed to monitor the tags of all incoming network transmissions and pull off any packets directed to any of the users that are connected to one of its ports. Packets then can be conveyed to the respective users via the appropriate switch output ports.

Cellular Networks

A cellular network is a communication network distributed over land areas called cells, each cell served by one or more fixed-location transceivers each location known as a cell site or base station. When joined together these cells provide radio coverage over a wide geographic area. This enables a large number of people with fixed and portable transceivers (such as mobile phones, office computers, laptop computers, etc.) to communicate with each other and with fixed transceivers and telephones anywhere in the network, via the base stations and to communicate with other equipment connected to the cellular network including the Internet.

A cellular network is used by an operator to achieve both coverage and capacity for its subscribers. Large geographic cells may be split into smaller cells to avoid line-of-sight signal loss and to support a large number of active phones and other communication equipment in that area. The cell sites may be connected to telephone exchanges, switches or routers, which in turn connect to the public telephone network or the Internet. In cities, each cell site may have a range of up to approximately ½ mile, while in rural areas, the range could be as much as 5 miles. It is possible that in clear open areas, a user may receive signals from a cell site 25 miles away.

A variety of multiplexing schemes are in use including: frequency division multiplex (FDM), time division multiplex (TDM), code division multiplex (CDM), and space division multiplex (SDM). Corresponding to these multiplexing schemes are the following access techniques: frequency division multiple access (FDMA), time division multiple access (TDMA), code division multiple access (CDMA), and space division multiple access (SDMA).

WiMax and LTE Technology

WiMax (Worldwide Interoperability for Microwave Access) is a wireless technology that operates in the 2.5 GHz, 3.5 GHz and 5.8 GHz frequency bands, which typically are licensed by various government authorities. WiMax is based on an radio frequency technology called Orthogonal Frequency Division Multiplexing (OFDM), which is a very effective means of transferring data. WiMax is a standard-based wireless technology that provides high throughput broadband point to multipoint connections over relatively long distances up to a few kilometers. WiMax can be used for a number of applications, including "last mile" broadband connections, hotspots and high-speed connectivity to the Internet for customers. It provides wireless metropolitan area network connectivity at speeds up to 20 Mbps and WiMax base stations on the average can cover 5 to 10 km. Typically, a WiMax base station consists of electronics, a WiMax tower and a WiMax transceiver programmed to connect Internet customers of a service provider within the service area of the base station. Information accumulated at the base station must be transmitted to and from facilities of the service provider. A variety of communication facilities (including fiber optics, cable and twisted pairs) are used by the service providers to connect the base stations to the rest of the Internet. These communication facilities are sometimes referred to as "trunk lines".

LTE is a technology similar to WiMax. LTE stands for "long term evolution". So far, Vodafone, Verizon, and AT&T have declared their support for LTE technology and intend to adopt it as their next-generation mobile communications technology. Intel and various manufacturers of customer premise equipment have been the main supporter for WiMAX, mainly in Asian and European countries. Clearwire's WiMAX service is available in major US cities and offers 120 MHz on the 2.6 GHz band, while LTE is not expected to be extensively available until 2013. In terms of technology, WiMAX and LTE are very similar, with major differences occurring in transmission speed and the openness of each network. LTE is faster, but WiMAX is more wide spread. WiMAX is already commercially available, while LTE is still under construction.

Trunk Line Transmission

To transmit a typical telephone conversation digitally utilizes about 5,000 bits per second (5 Kbits per second). Music can be transmitted point to point in real time with good quality using MP3 technology at digital data rates of 64 Kbits per second. Conventional video can be transmitted in real time at data rates of about 5 million bits per second (5 Mbits per second). High Definition (HD) video may require a delivery rate at 45 or 90 Mbps.

Companies, such as line telephone, cellular telephone and cable companies, which transmit information for hundreds, thousands or millions of customers, build trunk lines to handle high volumes of information. These trunk lines may carry hundreds or thousands of messages simultaneously using multiplexing techniques. Thus, high volume trunk lines must be able to transmit in the gigabit (billion bits, Gbits, per second) range. Most modern trunk lines utilize fiber optic lines. A typical fiber optic line can carry about 1 to 10 Gbits per second and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months, especially if the route is over private property or produces environmental controversy. Often the expected revenue from the potential users of a particular trunk line under consideration does not justify the cost of the fiber optic trunk line. Digital microwave communication has been available since the mid-1970's. Service in the 18 to 23 GHz radio spectrum is called "short-haul microwave" providing point-to-point service operating between 2 and 7 miles and supporting between four to eight T1 links (each at 1.544 Mbps). More recently, microwave systems operating in the 11 to 38 GHz band have been designed to transmit at rates up to 155 Mbps (which is a standard transmit frequency known as "OC-3 Standard") using high order modulation schemes.

Millimeter Wave Radios for High Speed Point to Point Communication

In 2001 workers at Trex Enterprises Corporation demonstrated a millimeter wave communication link that provided gigabit-per-second wireless communication over several miles and were awarded U.S. Pat. No. 6,556,836 describing the link. The frequencies used in Trex millimeter wave link are in the range of about 70 GHz-95 GHz. The physical coverage of Trex millimeter wave link is typically in the range of 1 to 5 miles. Trex millimeter wave link technologies have been used in commercial products and demonstrated high reliability. Trex workers have included a microwave backup link, provided for continuing the communication in the case of heavy rain which could interrupt the millimeter wave link.

Metro Ethernet

Ethernet, discussed above, is a set of frame-based computer networking protocols which is frequently used in Local Area Networks (LANs) such as a computer network in a home or office environment. A Metro Ethernet is a network that covers a metropolitan area and that is based on the Ethernet standard. It is commonly used as a metropolitan access network to connect residential and businesses subscribers to a larger service network or the Internet.

Virtual LAN

A virtual LAN, commonly known as a VLAN (for virtual local area network), is a group of programmable terminal/host devices programmed with special software that allow the devices to communicate, as if they were physically connected, regardless of their physical location. A VLAN has the same attributes as a physical LAN, but it allows for terminal/host devices to be functionally grouped together even if located miles apart. Network reconfiguration can be accomplished through software instead of physically relocating devices.

Backhaul Techniques

Most of the information collected at cellular base stations from customers within the cells must typically be transmitted to some communications point of presence or other location for transmission elsewhere. Similarly provisions must be made for incoming information from the point of presence that is intended for the cellular customers. A typical cell can have hundreds of customers so the amount of information can be huge. This communication between the base stations and the central office is referred to as "backhaul". In the early days of cellular communication this backhaul was typically handled by telephone lines or microwave radios. Fiber optics and cable has also been used.

Millimeter Wave Radios for Cellular Information Backhaul

U.S. Pat. No. 6,714,800, U.S. Pat. No. 7,062,293 and U.S. Pat. No. 7,769,347 assigned to Applicants' employer, describe systems designed for the use of millimeter wave radios to provide backhaul for customers of cellular systems. These patents are incorporated herein by reference. Those patents described wireless cellular communication systems in which groups of cellular base stations communicate with a central office via a narrow-beam millimeter wave trunk line. The transceivers are equipped with antennas providing beam divergences small enough to ensure efficient spatial and directional partitioning of the data channels so that an almost unlimited number of point-to-point transceivers will be able to simultaneously use the same millimeter wave spectrum. In network described in the patents the trunk line communication links operated within the 92 to 95 GHz or 71 to 76 GHz and 81 to 86 GHz portions of the millimeter spectrum in the same general region. Embodiments described in these patents propose the use of a backup system such as a microwave radio for continuing the communication with the central office in the case of heavy rain which could interrupt the millimeter wave links.

Last Mile and Middle Mile Communication Services

The United States and many other countries are crisscrossed by many thousands of miles of fiber optic communications links providing almost unlimited telecommunication between major population centers. Telephone companies provide communications services to nearly all of the homes and offices in the United States and many other countries, but existing telephone services in many areas provide only low speed (i.e. low data rate) connections. Communication companies are rapidly improving these last mile services with cable and fiber optic connections but these improvements are expensive and a large number of people are still without access to high speed telecommunication services. Many cellular systems are becoming overloaded due to the increased bandwidth required by the iPhone 4 and similar consumer products and prior art backhaul facilities are fast becoming inadequate.

The Need

What is needed in a large number of locations is a high bandwidth, low latency middle-mile, last mile core communication network that can make cost effective, high-speed, middle mile, last-mile communication available to communication organizations and other businesses as well as the general public.

SUMMARY OF THE INVENTION

The present invention provides a high bandwidth, low latency middle-mile, last mile core communications network providing low-cost and high-speed communications among the users of the network. Embodiments of the invention include a number of network access points located at a number of spaced apart sites. At least some of these network access points in the network are in communication with each other via millimeter radio links. In preferred embodiments the millimeter radio links include two millimeter radios, one transmitting in the frequency range of 71-76 GHz and receiving in the frequency range if 81 to 86 GHz and the other radio transmitting in the frequency range of 81-86 GHz and receiving in the frequency range if 71 to 76 GHz. In these preferred embodiments each millimeter wave radio is equipped with an antenna designed to produce a millimeter wave beam with an angular spread of less than two degrees. A high-speed switch is located at each network access point. The switches include a plurality of ports through which a plurality of network users transmits information through the network. Preferred embodiments include an Ethernet switch programmed to encapsulate and tag incoming packets with a special set of tags which allow the tagging switch and other Ethernet switches in the network to direct the packets to one or more output ports of itself and/or one or more of the output ports of other Ethernet switches at one or more distant network access points without a need for any of the network switches to read any MAC or IP address information contained in the packets. The Ethernet switches are also programmed to remove the special tags prior to transmitting the packets to network users to which the packets are directed. This arrangement of millimeter radio links and Ethernet switches permits communication through the network with almost zero latency.

Preferred embodiments utilize millimeter wave radios programmed to operate at data rates of up to Gigabit Ethernet rates. In other preferred embodiments at least some of the millimeter wave radios are programmed to operate at data rates up to 10 Gigabit Ethernet rates. Some preferred embodiments include a WiMax or LTE base station located at one or more network access point to provide point-to-multipoint service to a large number of end users. In these preferred embodiments the base stations may be owned by Internet service providers that are customers of a network operator. The base stations provide communication between the end users who are customers of the Internet service provider. Preferred embodiments permit a network operator to establish virtual local area networks with almost zero latency for customers of the network having facilities separated by substantial distances but located within the region served by the network. These virtual LANs include communication equipment of customers connected through ports of the Ethernet switches located at a number of network access points each of which may be several kilometers apart but in communication with each other at speeds approximately equal to the speed of light with almost zero latency.

Preferred embodiments of the present invention can be utilized for providing last mile and middle mile communication in a number of applications including specifically the following:

1) Point to point connections: Organizations with scattered facilities can seamlessly link the multiple locations together scaling bandwidth as needed.

2) Rural connections: Rural municipalities to become Internet providers or they can license a provider to provide to the residents the Internet services and other services such as satellite television.

3) Temporary high bandwidth communication: High bandwidth communication can be established within a few minutes or hours in case of emergencies or for remote locations.

4) Expansion of network services: The network can be made available for low cost expansion of the infrastructure of existing network service providers.

5) Expansion of telecom carriers: The network can be utilized by telephone companies to avoid bottlenecks such as those recently caused by increased use of smart phones and to expand their services for example to provide Internet television.

6) Public safety and emergencies: Built in facilities can be utilized by government and other public agencies to provide emergency services. Mobile millimeter wave equipment can also be made available for middle mile communication when existing equipment is down.

7) Flexibility: The network is extremely flexible and can provide any or all of the above services simultaneously.

Preferred networks may include combinations of communication equipment including hybrid millimeter and microwave links, microwave links, and fiber optic links as well as the millimeter wave links.

Prototype Network

A prototype embodiment of the present invention has been constructed by Applicants. A very similar network with some improvements is described in detail in the drawings. This network includes seven network access points in communication with each other in a ring configuration via millimeter radio links each with a microwave backup link. Cellular WiMax base stations are located at three of the access points permitting WiMax communication between residents of the region and each of the Internet service providers. Each of the base stations includes at least one off-the-shelf high-speed Ethernet switch with a number of fiber optic gigabit-per-second Ethernet (GigE) ports operating at speeds up to 1.25 Gbps and a number of copper wired ports operating at speeds of 10 or 100 Mbps. Hardware and software in the off-the-shelf switches permit almost immediate communication between the ports. Controls in the switches also are available to limit the bandwidth available at the high speed ports. Each access point also includes millimeter radios operating at speeds of 1.25 Gbps and a backup microwave radio operating at speeds of about 100 to 300 Mbps to provide for high speed communication between access points. All seven of the access points are equipped with two millimeter wave radios and their backup microwave radios to permit all of the access points to be in communication with each other (except in very bad weather) at speeds up to 1.25 Gbps in a seven point ring. Two of the network access points include an additional link connecting them to define two additional sub-rings. Additional radios, microwave and millimeter wave, are provided as needed at the access points to permit radio communication with high volume users of the network. These facilities permit Applicants to offer its customers low-cost unimpeded speed-of-light communication throughout Applicants' network at the bandwidths tailored to the needs of each of the customers. Existing customers of the network include Internet service providers, and several private line point to point customers. In addition, the network connects to the thousands of WiMax customers of the Internet service providers from which the Internet service provider directly (and Applicants' employer indirectly) derive revenue.

DETAILED DESCRIPTION OF PREFERRED EMBODIMENTS

First Preferred Broad Band Network

Figure 1:
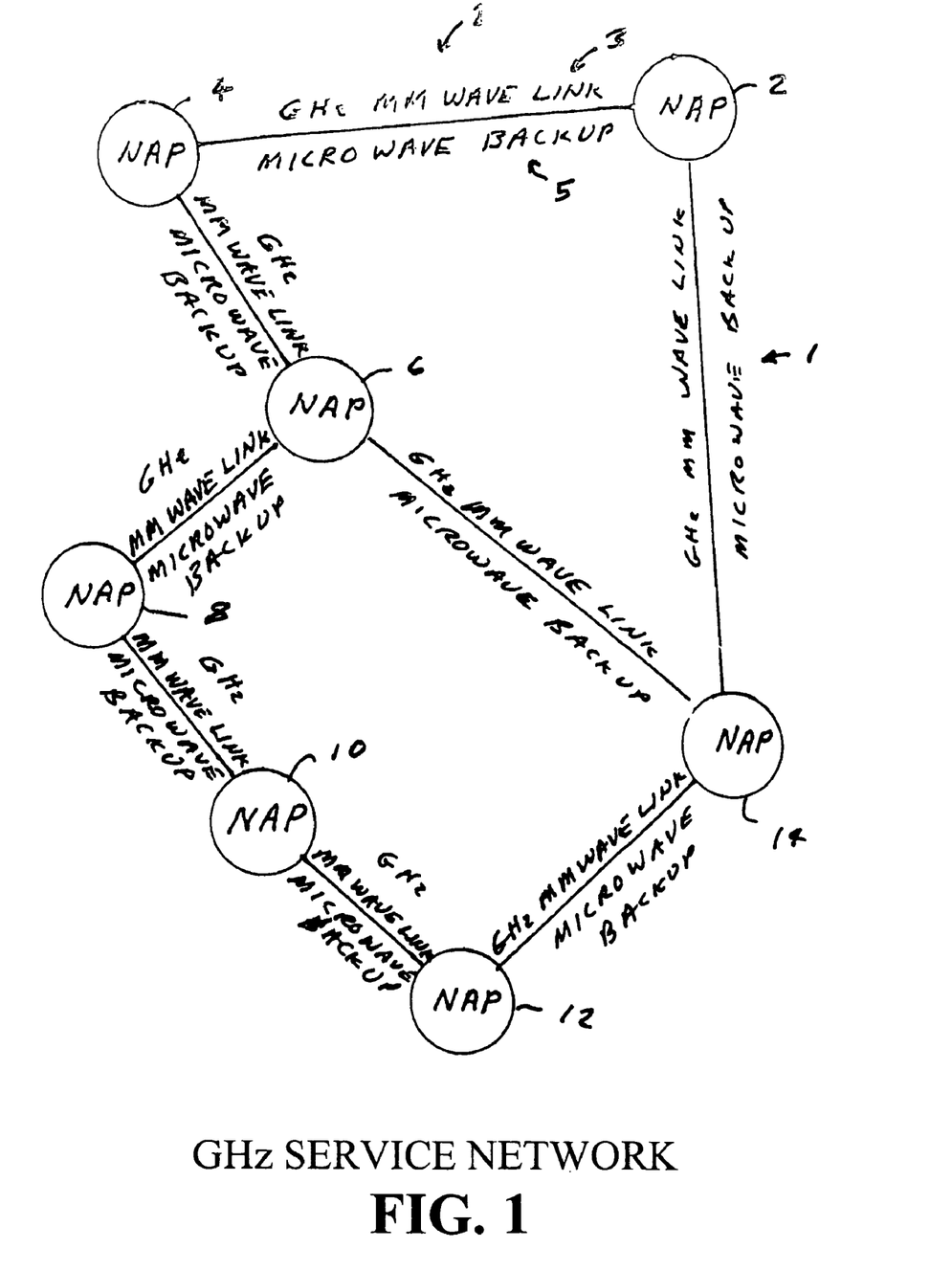
FIG. 1 is a sketch showing network access points of a basic network according to the present invention.
Figure 4:
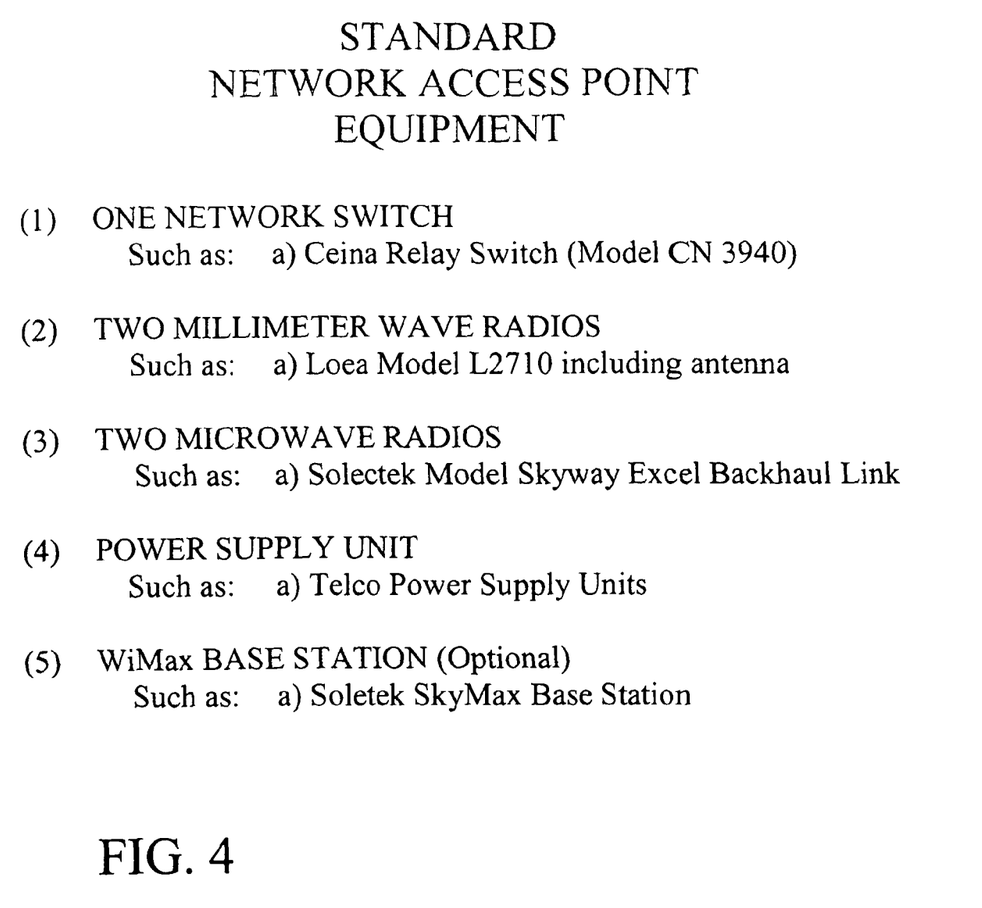
FIG. 4 describes basic communication equipment located at the access points.

FIG. 1 is a sketch of a prototype broadband communication network substantially similar to a network developed and operated by Applicants covering a 50 square kilometer region on the Island of Oahu in Hawaii. This prototype network includes seven network access points 2, 4, 6, 8, 10, 12, and 14 referred to by Applicants as "NAPs". These NAPs are in radio communication with through six radio channels 1 each channel including a two-radio millimeter wave radio link 3 operating at 71-76 GHz and 81-86 GHz. The radios are Models L2710 available from Loea Corporation with offices in Honolulu, Hi. These radios support data rates of 1 Gbps for the Gigabit Ethernet standard which was developed for fiber optic communication. Each of the millimeter wave links has a microwave backup radio link 5 operating at frequencies in the range of about 11 GHz which automatically continues the communication in case the millimeter wave link is broken due to heavy rain or other disturbance. Preferred backup links include Model Skyway Excel Backhaul Link supplied by supplied by Solectek Broadband Wireless Networks with offices in San Diego, Calif. The links provide a communication ring network of NAPs 2, 4, 6, 8, 10, 12 and 14. NAPs 6 and 14 are each equipped with a third set of millimeter wave and backup transceivers to in effect provide for a potential of three communication rings. As described in FIG. 4 basic equipment located in each of the NAPs includes a power distribution system made by Argus (Model No. CXI650) which is available from Tessco Technologies Inc. with offices in Hunt Valley, Md., a high speed switch (such as Model No. CN 3940) available from Ciena Inc. with offices in Linthicum, Md.; and a WiMax base station (Model: SkyMax Base Station) made by Solectek Corporation with offices in San Diego, Calif. and purchased from Tessco Technologies. Each of the access points may include additional communication channels for access to the network by the network customers. These additional channels may include optical fiber connections, twisted pair connections, cable connections as well as millimeter and microwave radio links.

Network Switches

Each of the network access points is comprised of one circuit switch. The switches control the flow of information throughout the network using switched Ethernet protocol. These switches are the "brains" of the network and are available from suppliers such as Ciena or Cisco Systems. All of the switches in Aplicants' prototype network are Ciena switches. A good choice is the Model No. CN 3940 Ciena switch. These switches were designed for use in networks having optical fibers. Applicants are able to utilize these off-the-shelf switches by feeding the transmit portion of the millimeter wave radios with an optical fiber from the switch and by converting the millimeter wave incoming signal received by the receiver portion of the millimeter wave transceiver into an optical signal which is transmitted via optical fiber to the switch. An important feature of the present invention is that packets of information are transmitted though the network without any need to read packet addresses. The switches are programmed to encapsulate the packets and tag the packets with a special tag that identifies the specific output port of all of the circuit switches in the network to which the packet is directed. All of the circuit switches in the network are pre-programmed to watch for tags directed to one of their output ports and to ignore all packets not directed to one of their output ports. When a packet is directed to an output port of a particular switch, the switch merely directs the packet to the specified output port. The whole process, including the transit time of the millimeter wave signals, is less than a few microseconds so the total latency of the network almost zero.

Figure 2:
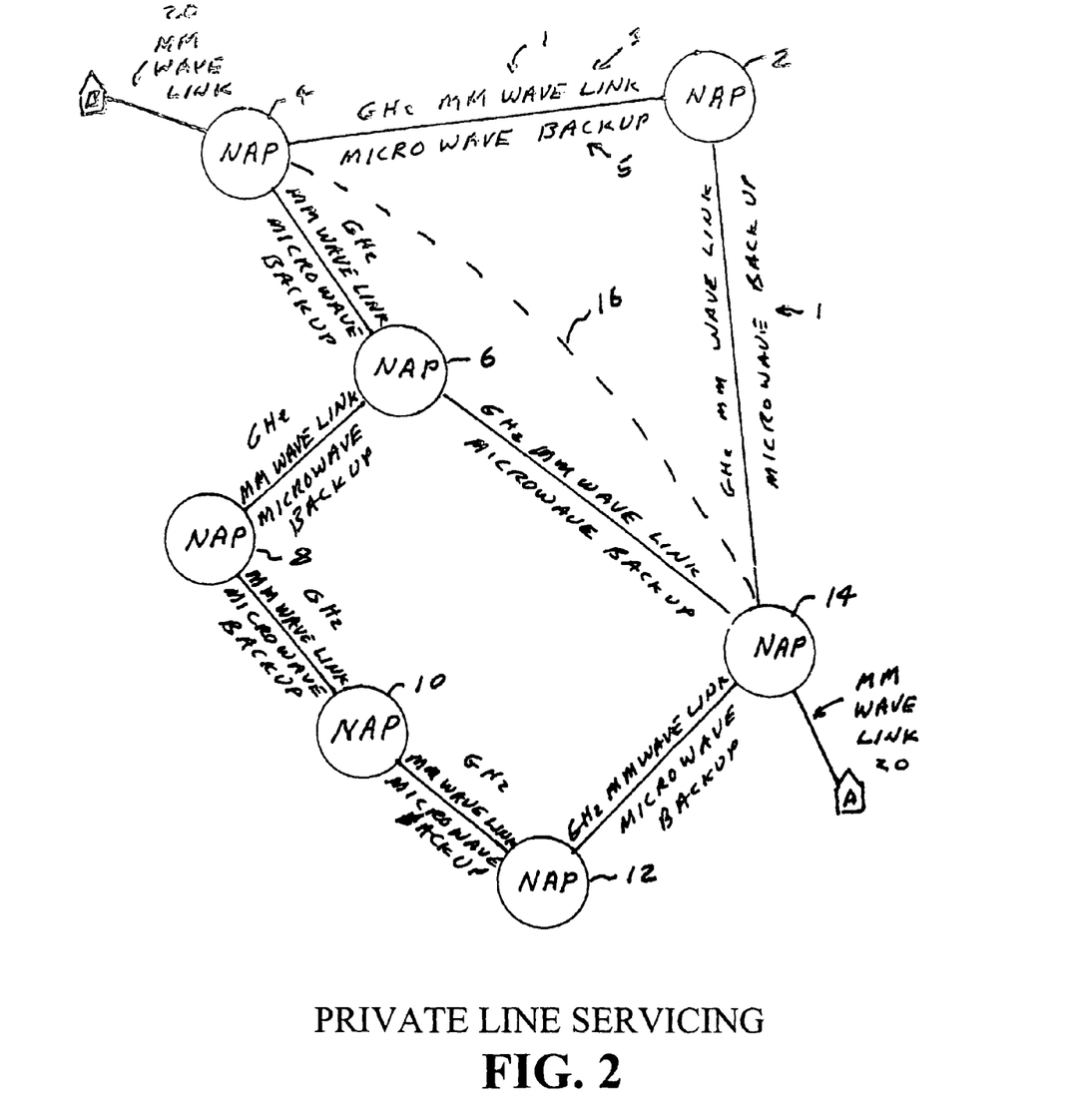
FIG. 2 shows examples of private line servicing added to the basic network.

FIG. 2 illustrates private line servicing provided by the network operator to a customer which has facility A (located near NAP 14) and facility B (located near NAP 4). These facilities are physically separated from each other by several miles. The network operator is able to provide to the customer private secure high data rate communication via three routes (i.e.: NAPs 14, 2 and 4; NAPS 14, 6 and 4 and NAPs 14, 12, 8, 6 and 4. Facilities A and B communicates with the network via millimeter wave links 20. The specific route through the NAPs is pre-programmed into the circuit switches, so that communication through the switches is taken care of by fast firmware as opposed to slow software routing. The net effect is virtual path 16 at speeds close to the speed of light. The result is almost zero latency.

Figure 3:
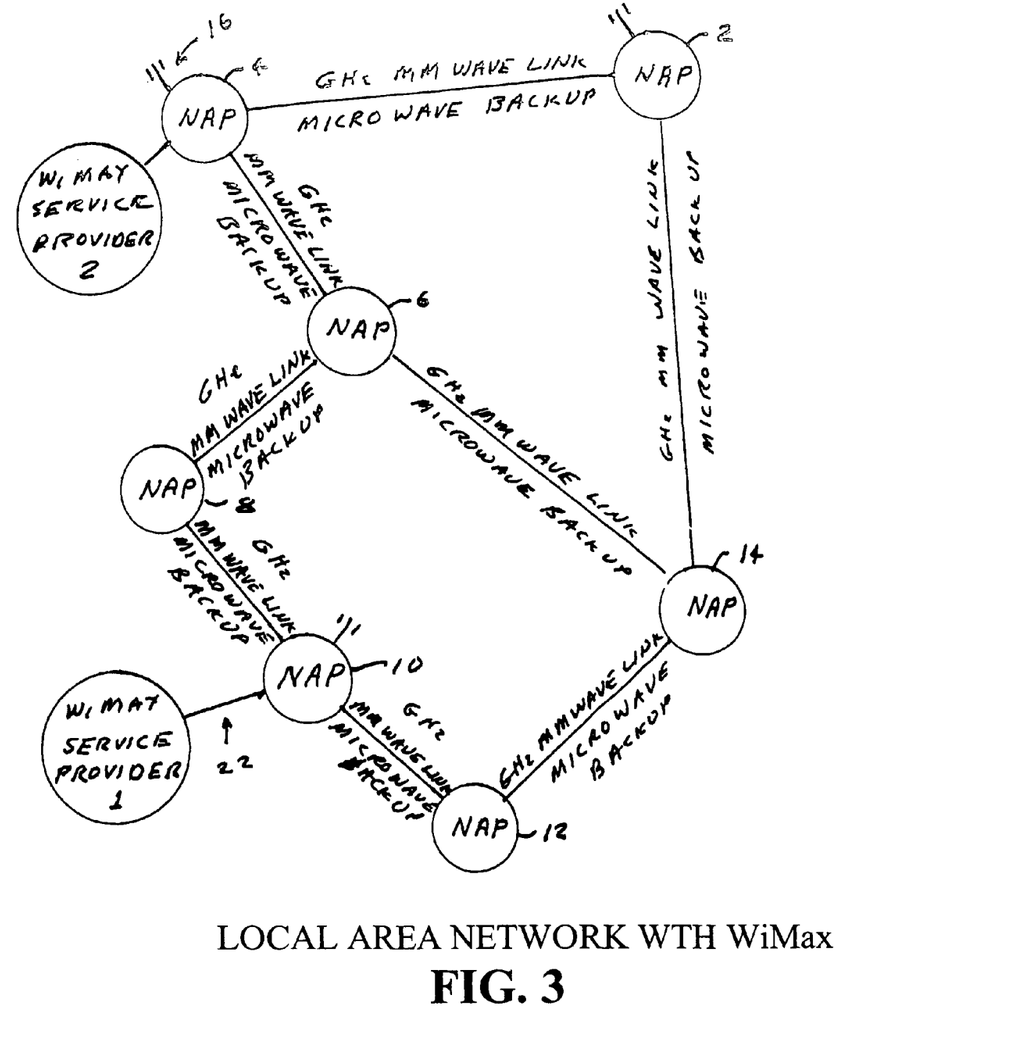
FIG. 3 demonstrates the addition to the network of WiMax communication between users and service providers operating on the network.

FIG. 3 illustrates how the network is utilized to provide backhaul to service providers 1 and 2 from their WiMax customers within the network region. Both of the service providers install WiMax base stations at NAPs 2, 4 and 10. Service provider 1 communicates with the network through NAP 10 and service provider 2 communicates with the network via NAP 4. Depending on distances and other conditions, the communication could be via twisted pair, cable, fiber or wireless (millimeter wave or microwave). Several routes between the base stations and the service providers are available. Desired routes are determined in advance and programmed into the circuit switches so as above all communication from the base stations to the service providers is taken care of by fast firmware as opposed to slow software routing. And as above the result is almost zero latency.

The circuit switches such as the ones referred to above can be controlled by the network operator to change the routes of the information in the event of a disruption of any of the links or to better distribute the information flow. The switching can also be programmed to occur automatically, for example when heavy rain disrupts the millimeter wave transmission its backup microwave link will take over. The network can also be programmed to reroute information automatically when one or more of the routes approach capacity or are disrupted. Switching is almost instantaneous.

Networks like the one shown in FIG. 1 allow existing service providers with large customer bases to acquire low-cost additional bandwidth as needed in the region served by the network and/or to expand their service into the region. When the network extends into regions where there is little or no communications infrastructure, the network's customers may easily increase their customer base or the network's owner may act as a full service provider to provide Internet and other services. Metro Ethernet service provided by Applicants' network delivers a simple migration to higher performance and value. It leverages an existing local area network infrastructure and staff resources, eliminating cost intensive customer premise equipment purchases and staff training.

Other Network Layouts

Figure 5A:
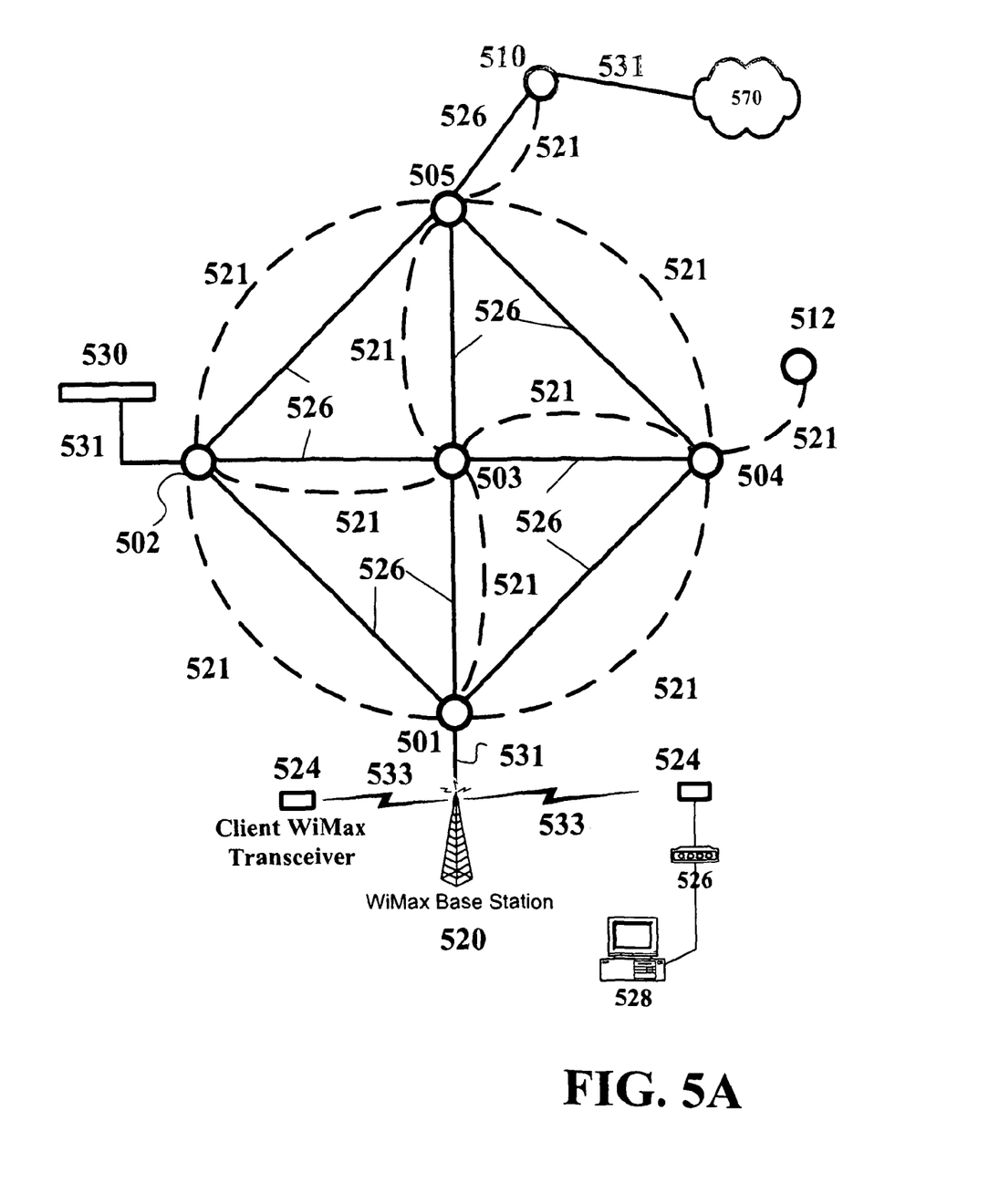
FIGS. 5A-5D illustrate other preferred embodiments of the present invention.

FIGS. 5A through 5D illustrate other potential network layouts. FIG. 5A illustrates a generic wireless network map according to a preferred embodiment of the present invention. There are five network access points, labeled 501, 502, 503, 504 and 505 shown in the figure. Solid lines 526's represent the links with the use of the pencil beam millimeter wave radio. Dashed lines 521 represent the links by Microwave radio. In Applicants' preferred embodiments, the spectral frequency of the millimeter wave radio is in the range of 70-100 GHz. The frequency of the microwave radio is in the range of 800 MHz to 38 GHz. An interconnection between NAP N and NAP M can be denoted as link (N,M); for example the interconnection in between NAPs 501 and 502 would be called link (501,502). In FIG. 5A, each link (N,M) is realized by both links 521 and 526. Link 521, the microwave radio link, is used as a secondary link in case of millimeter wave link 526 fails. Millimeter wave link is the primary link which can provide up to 10 Gbps, but is more susceptible to rain-fade. (As mentioned in previous sections, Applicants preferred embodiments use a pair of millimeter wave radios to achieve millimeter wave duplex communication between two nodes; one radio has a transmit frequency in the range of 71-76 GHz and the other one in the range of 81-86 GHz.) On the other hand, the microwave link would not be substantially affected by rain, but typically delivers only up to a few hundred Mbps. The use of both millimeter wave and microwave links for each link would deliver high data rate communications most of the time while ensuring high reliability of network connectivity (although at a lower data rate) when the primary links fail due to rain. However, in the areas where heavy rain is rare or non-existing, network operators should make a trade-off analysis of cost and benefit whether to use millimeter wave alone or millimeter plus microwave for all node interconnections. Also for low data rate requirements a microwave link alone may be sufficient. For example for the link (504,512) a network designer may provide for only one microwave link 521 while in other occasions the designer may provide only a millimeter wave link 526. Normally links such as link (505,510) would include the millimeter wave link and the microwave backup link.

Applicants' clients can get access to the network at a selected NAP. For example, NAP 510 serves a network client that is connected to the network via NAP 5 using a combination of wireless links by 521 and 526. As a second example, NAP 512 may be more cost-effective to be linked to network via NAP 4 using microwave radio link 521 alone. A third example, shown in FIG. 5A, is a WiMax Base Station 520 which is connected to the network via NAP 501 using a hard wire (optical fiber or copper) 531. The WiMax base station 520 may be co-located with NAP 501 or within the proximity of NAP 501 where hard lines are available or can be installed cost-effectively. WiMax technology is used for point-to-multiple telecommunications; which uses wireless link 533 to multiple client WiMax transceivers 524. The fourth example shown in FIG. 5A is NAP 530 which is connected to the network via NAP 502 using hard wires (such as optical fiber or copper) 531. This fourth scenario is most likely applicable where a client server is co-located with a NAP or in close proximity (for example, within the same building) to the NAP and wired communication links are either readily available or can be cost-effectively installed. FIG. 5A further illustrates the path to enable an end user to get access to the Internet via Applicants network. An end user is represented by a terminal personal computer 528, which is connected to a client WiMax transceiver 524 via a digital modulation/demodulation device 526. Through the WiMax Base Station 520, it can communicate with the end user's Internet service provider 510 which gets access the network at NAP 505 via link (501,503), link (503,505) and link (505,510). The Internet service provider has its server connected to the World Wide Web (Internet) 570 via hard wires 531. With this path, the end user 528 would be able to get access to Internet even though it may be tens of miles away from its Internet service provider 510.

Figure 5B:
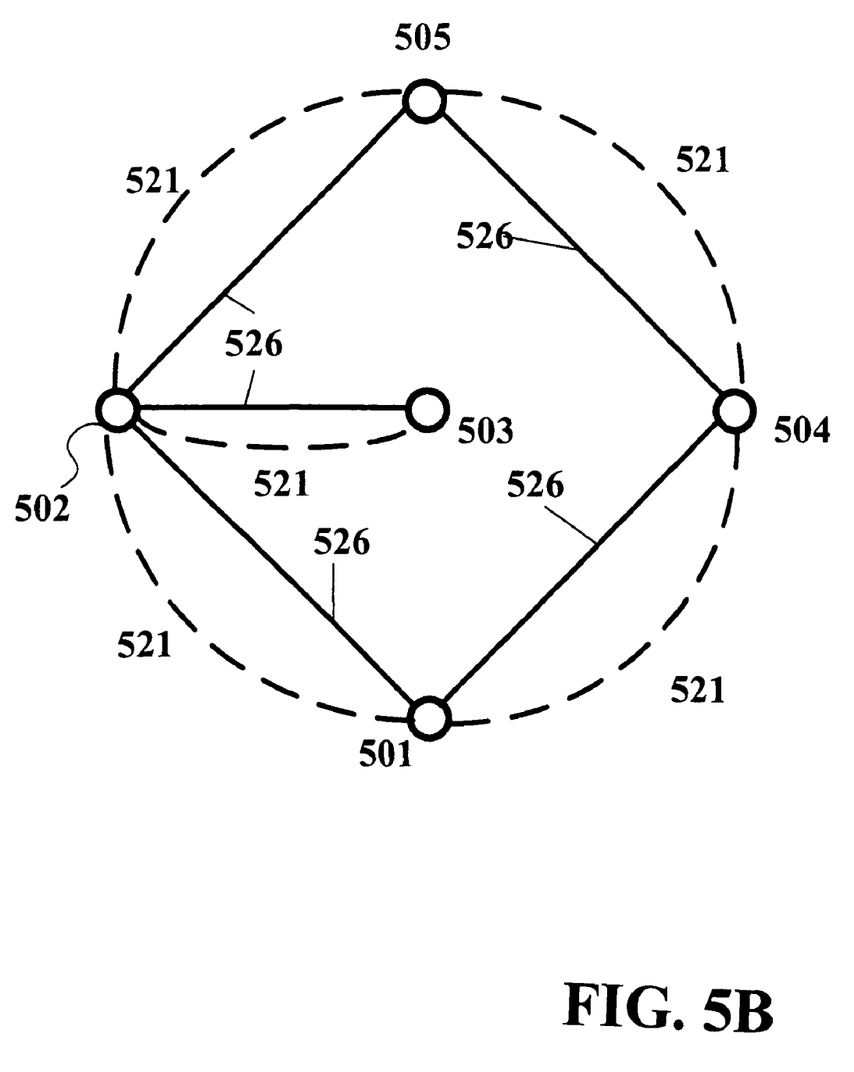

FIG. 5B shows a variant of the network shown in FIG. 5A, where link (503,505), link (503,504) and link (501,503) are removed for simplicity. However, each link still has a primary link by millimeter wave radio 526 and a secondary link by microwave wave radio 521. Because the transmission between two NAPs is very fast and adds very little overhead for communication management, the extra latency of a path via link (501,502) plus link (502,503) is negligible comparing to a direct link via Link(501,503). Therefore, the cost of setting up link (501,503) can be saved. The same is true for link (503,505) and link (503,504). As a result, the cost of the network setup may be reduced while the network performance may not suffer.

Figure 5C:
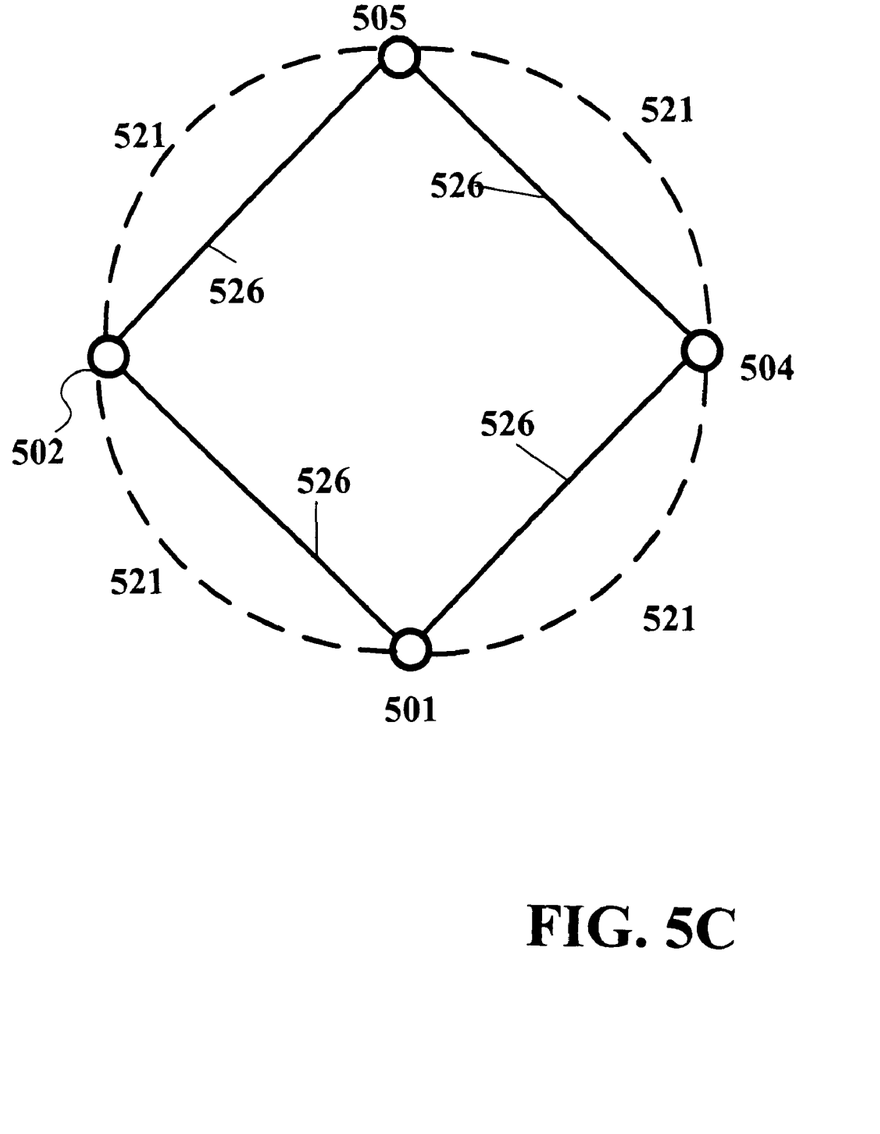

FIG. 5C is another variant where the center NAP 503 is removed but all remaining links still have both millimeter wave link 526 and microwave link 521. Take for instance a metropolitan area where rain-fail will affect a millimeter wave radio link with 0.01% failure in connectivity. A 0.01% fail-rate means 50 minutes of no-connectivity time per year, i.e., 99.99% (four 9's) of connectivity time. In the industry, it is often desirable to achieve at least 99.999% (five 9's, 5 minutes of no connectivity per year). Under this circumstance, network designers may deploy a microwave radio link (rain has a much smaller effect at microwave frequencies) as a secondary link. Let us assume, for the sake of illustration, a microwave link could have a 99.9999% connectivity. The clients needing five 9's reliability may include health providers, banks, and governments.

Figure 5D:
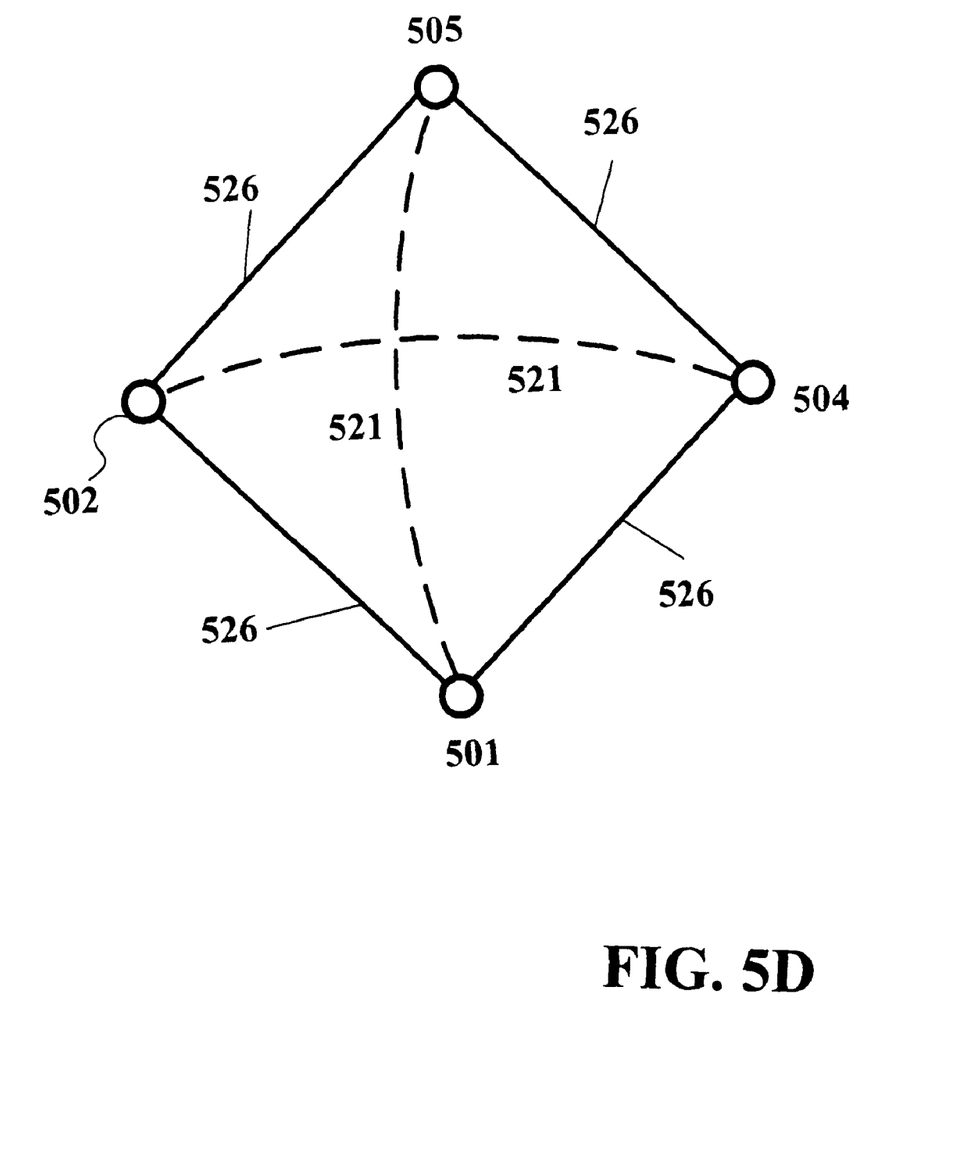

FIG. 5D is another variant where radio links are further simplified. In this configuration each NAP has two millimeter radio links 526 and one microwave radio link 521, connected to other NAPs. This network structure also provides high reliability. As an example, assume one needs to get data from NAP 501 to NAP 505. Under nominal conditions, to get from NAP 501 to 505, data are routed via link (501,502) and link (502,505). Assuming link (502,505) fails due to downpour of rain, the network can route the data via link (501,504) plus link (504,505) or via link (501,505) or via link (501,502) plus link (502,504) plus link (504, 505). The first criterion of the network is to consider paths achieving the highest possible data transmission speed, then the lowest possible latency. Therefore, link (501,505) and link (501,502) plus link (502, 504) plus link (504,505) would not be considered as an option until other shorter path options are exhausted. Because the first route uses only millimeter wave links 526 for link (501, 504) and link (504,505), such a route can lead to higher data rate and lower latency comparing to the other two routes, the network would then use it as the secondary route in the case that link (502,505) fails. The same logic is used to determine a complete network routing decision tree. From this structure, one can derive a rule of thumb for a high reliability Gbit wireless network is to ensure each node would have two high speed links (using millimeter wave radios) to other nodes of the same network, and at least one redundant lower speed link (using microwave radio) to another node of the same network. In FIG. 5D, all four NAPs possess three links. This is the basic structure of a triple level of redundancy because each node has three paths to be connected to other parts of the network. The FIG. 5C network provides four links at each NAP. With the principle explained above, persons skilled in this art would be able to design alternate networks with different number of network nodes and links to achieve multi-level redundancy to meet the customers' needs.

In the FIG. 5A network, Applicants propose WiMax Base Station 520 as an example in which a WiMax Base Station is back-hauled by the Applicants' wireless metro area network. When the WiMax Base Station is replaced with a Cellular Phone Base Station, with the same principle, the Applicants' network would be back-hauling a Cellular Base Station for a cost-effective and expandable solution to meet the cellular phone industry's future needs. Of course, the same principle is applicable to other future mobile wireless technologies, including long-term-evolution (LTE) wireless technology.

Advantages of Millimeter Wave Technology

As used herein the phrase "Millimeter Wave Technology" refers to frequencies between 30 GHz to 300 GHz or wavelengths between 1 and 10 millimeters. There are two major advantages of millimeter wave technology over microwave technology. The first advantage is the large amount of spectral bandwidth available. The bandwidth currently available in the 71 GHz to 76 GHz and 81 GHz to 86 GHz bands, a total of 10 GHz, is more than the sum total of all other licensed spectrum available for wireless radio communication. With such wide bandwidth available, millimeter wave wireless links can achieve capacities as high as 10 Gbps full duplex, which is unlikely to be matched by any lower frequency radio technologies. (One of the Applicants and a fellow worker have recently designed a 10 Gbps millimeter wave radio utilizing an eight-state phase modulation scheme described in U.S. patent application Ser. No. 12/928,017.) The availability of this extraordinary amount of bandwidth also enables the capability to scale the capacity of millimeter wave wireless links as demanded by market needs. Typical millimeter wave products commonly available today operate with spectral efficiency close to 1 bit/Hz. However, as the demand arises for higher capacity links, millimeter wave technology will be able to meet the higher demand by using more efficient modulation schemes. The second advantage is the limited width and range of the radio beam. With a two-foot antenna, beam widths are about one-half degree and the range is limited to about 10 miles or less. This means that many millimeter wave radios can be used in a single network all operating over the same frequency bands but pointed in different directions or originating or terminating at different points.

Figure 6:
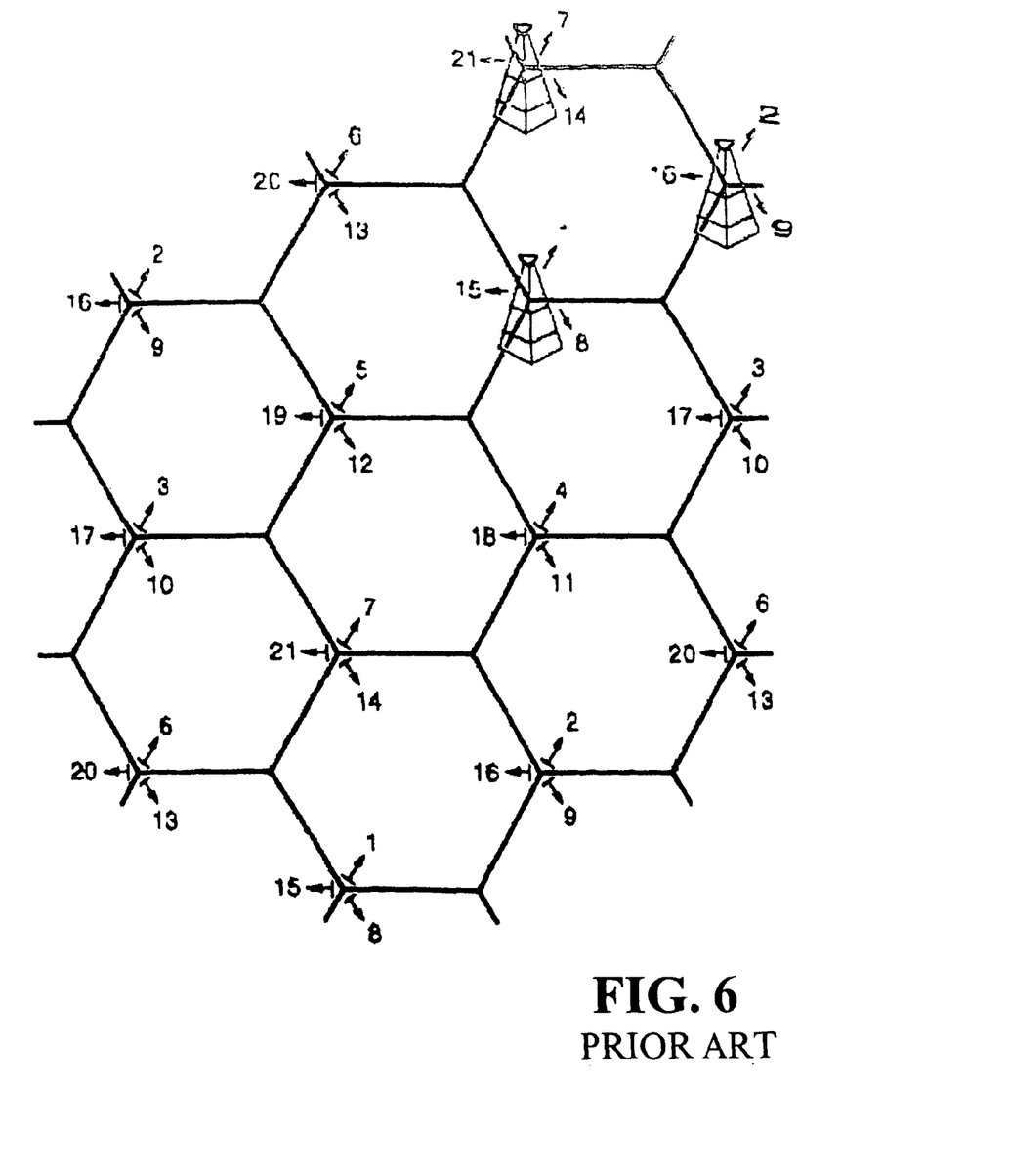
FIG. 6 shows a typical prior art cellular network.

In preferred embodiments Applicants expect to deploy their millimeter wave technologies in a honeycomb (referred to as comb) architecture as shown in FIG. 6. This allows Applicants' networks to trunk multiple gigabits of data per second for delivery. The networks have multiple access points, thereby creating a multi redundant network topology allowing for higher resiliency (self-healing network). These networks of millimeter wave radios become the foundation of Applicants' core Metro Ethernet network. Applicants offer a very high bandwidth and high availability core network and easily add additional communication channels almost without limit to provide additional services on top of the core network.

Advantage of Circuit Switching

With circuit switching as described above for preferred embodiments of the present invention, latency is almost zero as described above. No software is required in the actual transfer of information packets. Routes are programmed in advance. The information arrives at its destination in the network in the correct sequence. No reassembly is required. The network therefore can easily handle voice transmission and streaming video, both of which can be difficult or impossible with packet switching. With circuit switching as described above the network operator can contract with users to provide specified amounts of bandwidth with a very high probability that that bandwidth will be available when needed by the customer and with almost zero latency.

Applicants believe that its circuit switching provides increased security as compared to packet switching for the information being transmitted through the network. This is because the routes through the network are set in advance by the network and not by the packets. The network controls the firmware in the circuit switches so that information entering the network through a particular port is directed only to specified exit port or ports. The network operator can assure its customers that the customers' information entering a port assigned to the customer will exit the network only at exit ports assigned to the customer. Other customers of the network never get to see the packets. The portions of the information routes beyond the ports are in the control of the customer. In packet switched networks, packets are typically analyzed by a large number of computer components presenting opportunities to compromise the security of the information contained in the packets.

Microwave Technology

As used herein the phrase "microwave technology" refers to frequencies between 300 MHz and 38 GHz or wavelengths (i.e. 0.008 meter to 1.0 meter). Licensed microwave wireless Ethernet bridge systems operate with frequencies between 3 GHz to 38 GHz. Typical licensed microwave link frequencies operate within 3.65 GHz (as a point-to-multipoint wireless) and backhaul at 4.9 GHz (public Safety), 6 GHz, 11 GHz, 18 GHz, 23 GHz bands. Applicants operate their long distance links (links over 5 miles) at the 11 GHz, 18 GHz, and 23 GHz licensed bands. This allows Applicants to develop self healing long range service uplinks from one microwave comb to another microwave comb. By doing this Applicants can create extended core connections that provide the ability to disseminate services over vast areas while maintaining the core bandwidth speed needed as well as the network functionality.

Hybrid Links

Preferred embodiments include hybrid links which combine microwave transceivers with millimeter wave transceivers with an automatic switch over to microwave in case of loss of millimeter wave communication on the link. These hybrid links may be designed for both the millimeter wave transceivers and the microwave transceivers to utilize the same antennas.

Future Services

The next layer of distribution services being tested by Applicants is a system that allows for multi-frequency distribution. Preferred base stations have the following features:
  A throughput of 310 Mbps per sector maximum
  Programmable channel bandwidth
  Support advanced adaptive antenna capabilities
  Supports broken spectrum patching
  Support base stations to base station trunking
  Supports frequency division multiplexing uplink/downlink channels
  Supports time division multiplexing uplink/downlink channels
  Interference avoidance technology
  Programmable multi-band operation (500 MHz-8 GHz) WiMax frequency dual channels.

Additionally the customer premise unit can be enhanced for Internet distribution as well as a fully mobile cell phone service. Additionally upgrading the customer premise equipment to USB mobile can provide the following additional services:
  100 Mbps maximum throughput
  Fully integrated modem, radio and antenna for easy installation
  Internet protocol television set top box integration with time-shift recording
  Voice over Internet protocol residential phone gate.

Network Cost

The present invention provides opportunities of provide high quality communication to large numbers of people at a greatly reduced cost as compared to all other options. Network build costs are segmented between core build and augmentation build. In most cases the core build of the network is defined as the initial service segment. The initial service segment is made up of an initial service ring allowing for expansion points to build out comb architecture. The initial service comb can then be expanded to service larger areas. Each service segment is made up of separate aggregation locations. These locations are defined as:

Network access points (NAPs) described above refer to an access locations where services can be originated or distributed.

Network exchange (NEXs) refer to locations were network services can be originated, distributed or exchanged between separate networks or network architectures. The main difference between a NAP and a NEX is the switching ability to exchange data between different network architectures. The most common example of a NEX build is a build that is done within a data center. In most markets the number of NEXs will be between 1 and 3 whereas the NAPs will typically be in the range at least 20 or 30 and can exceed hundreds or thousands.

In examining the costs of building these networks Applicants have examined two types of builds: core build and aggregation builds described as follows:

Core Build

The core build of the network is defined as the initial base site installation. This installation is the base of every site location that is built. The components and capabilities that make up this build are as follows:
  1. Power Distribution and cabinet—This is a DC power plant and security cabinet. The power plant typically contains a connection to wired power along with 300 ampere hours of backup power locked in a locked steel outdoor cabinet.
  2. WiMax Base Station—This is a single WiMax base-station allowing for initial WiMax distribution.
  3. Backhaul connecting radios—These radios are the terminals of two millimeter wave radio links that connect to the trunk network and allow for redundant core bandwidth.
  4. Backup connection radios—Microwave backup radios for inclement weather backup to primary millimeter wave radios.
  5. An aggregation metro Ethernet switch.

These builds are capable of servicing a maximum of about 500 WiMax customers and 10 Metro Ethernet customers with no augmentation based on the assumption that each metro Ethernet customer utilizes a 100 Mbps circuit. Of the 3.2 Gbps available Applicants calculate all capacities on 50% total utilization permitting them to hold 1.6 Gbps in reserve. In order to calculate a cost per customer Applicants assume a 50% saturation of Metro Ethernet customers and 70% saturation of WiMax customers before augmentation is needed. Applicants then spread the total cost of the site build between these two market segments. For example the total amount of a fully augmented WiMax site is 400 Mbps or 25% of the total allocated service backhaul bandwidth of the site. Dedicated Metro Ethernet services are allocated at 1.2 Gbps per site or 75% of the total service backhaul.

Augment Build

This is a build that augments the existing services of a NAP or NEX to allow for expanded customer aggregation. This is done primarily for WiMax distribution when augmenting a site for expanded Metro Ethernet services. The augment cost is broken down into the contractual cost of the service. At each NEX or NAP location the initial build of the site allows for 1 of 4 possible WiMax base-stations or 25% of the WiMax service capacity of the site. Each base-station can have a maximum connection base of 500 customers; however due to network loading Applicants intend to limit the customer base at 350 per station before augmenting. Augmenting a site consists of 3 types of Augmentation:

1. Initial WiMax Augmentation—Initial WiMax augmentation consists of an additional WiMax base-station and a WiMax Controller with GPS Sync. The Controller with GPS Sync synchronizes the base stations so they do not interfere with each other. It is only required when two or more base-stations are located on the same build site. Each Controller with GPS sync can handle up to 4 base-stations so only one is needed per augmented site.
2. Additional WiMax Augmentation—This augmentation only consists of an additional WiMax base-station.
3. Backhaul Augmentation—Is only needed if a site has become saturated beyond 80% of capacity and is accomplished by adding one or more additional millimeter wave radios to increase core bandwidth.

Applicants estimate that when augmentation is needed because of additional customers, the cost per customer will ultimately decrease substantially.

Variations

Although the present invention has been described above in terms of preferred embodiments, persons skilled in this art will recognize there are many changes and variations that are possible within the basic concepts of the invention. For example, as suggested above future networks may utilize a WiMax or LTE cellular base stations for point to point communication or a combination of both types of these base stations or other types of base stations that may be developed in the future. Backup for the millimeter wave links could include dedicated telephone links or other available backup links. In some networks the network operator may provide the cellular Internet point to multipoint service instead of it being provided by one or more Internet service providers. Future networks will operate at 10 Gbps rates and will need 10 Gbps switches, preferably 10 Gbps Ethernet switches as well as the 10 Gbps millimeter wave radios such as the radios described in U.S. patent application Ser. No. 12/928,017.

Some of the network links between NAPs may in some cases be provided using equipment other than millimeter wave radios. For example, where extremely high data rates are required one or more optical fiber links may be utilized. Also where the data rate requirements are low, a microwave or T1 link may be sufficient. As indicated above there are advantages for arranging the NAPs to form at least one ring. And provision may be made for several rings to provide alternative paths through the network. Typically more than half of the links in the rings will include millimeter wave links. As suggested above in some embodiments all of the links in the rings could include millimeter wave links. Therefore the reader should determine the scope of the present invention by the appended claims and not by the specific examples described above.

What is claimed is:

1. A cellular communications network providing wireless radio communication among a plurality of users comprising radio communication equipment located at a plurality of spaced apart sites, each site defining a network access point, said radio communication equipment at each of said plurality of spaced apart sites comprising;

A) at least two millimeter wave radio systems, each of said at least two radio systems having an antenna configured to produce a millimeter wave beam with angular spread of less than two degrees and configured for providing millimeter wave radio with other millimeter wave radio systems at other network access points,
B) a programmable high-speed communication switch having a plurality of input and output ports,
C) power distribution equipment for providing electric power to said millimeter wave systems and an Ethernet switch and said radio communication equipment at least some of said plurality of spaced apart sites also comprising a cellular base station comprising a microwave radio transceiver providing microwave communication and configured to provide point-to-multipoint microwave communication with network base station users located within a region defining a cell or part of a cell, and said radio communication equipment at least some of said plurality of spaced apart sites also comprising additional communication equipment configured for communication with other network user;

wherein said high speed switches are comprised of firmware which is configured to recognize tags applied the packets by other of said high speed switches and which is configured to encapsulate and tag incoming packets with a tag identifying one or more output ports of one or more of said high speed switches to which the packet is directed.

2. The network as in claim 1 wherein at least a plurality of said high speed communication switches are Ethernet service delivery switches.

3. The network as in claim 2 wherein at least a plurality of said high speed communication switches are Gigabit Ethernet service delivery switches.

4. The network as in claim 2 wherein at least a plurality of said high speed communication switches are Gigabit Ethernet service delivery switches.

5. The network as in claim 3 wherein said backup communication equipment comprises microwave communication equipment.

6. The network as in claim 1 wherein at least a plurality of said network access points are arranged in at least one ring.

7. The network as in claim 1 wherein at least a plurality of said network access points are arranged in a plurality of rings.

8. The network as in claim 1 wherein each of said at least two millimeter wave radio systems are configured to operate at frequencies in ranges of about 71 to 76 GHz and 81 to 86 GHz defining two millimeter frequency bands.

9. The network as in claim 1 wherein said additional communication equipment configured for communication with other network users is comprised of microwave radios.

10. The network as in claim 1 wherein said additional communication equipment configured for communication with other network users is comprised of millimeter wave radios.

11. The network as in claim 1 wherein said other network users includes at least one Internet service provider.

12. The network as in claim 1 wherein said other network users includes a plurality of Internet service providers.

13. The network as in claim 2 wherein said backup microwave radio is configured to utilize the same antenna as the millimeter wave radio it is backing up.

* * * * *